(12) United States Patent
Stanley et al.

(10) Patent No.: US 12,099,173 B2
(45) Date of Patent: Sep. 24, 2024

(54) TWO MIRROR SCANNING RELAY OPTICS

(71) Applicant: Magic Leap, Inc., Plantation, FL (US)

(72) Inventors: Ross Peter Stanley, Epalinges (CH); Eric Julian Tremblay, Ecublens (CH); Philippe De Gol, Muraz (CH)

(73) Assignee: Magic Leap, Inc., Plantation, FL (US)

( * ) Notice: Subject to any disclaimer, the term of this patent is extended or adjusted under 35 U.S.C. 154(b) by 319 days.

(21) Appl. No.: 17/154,965

(22) Filed: Jan. 21, 2021

(65) Prior Publication Data

US 2021/0227187 A1   Jul. 22, 2021

Related U.S. Application Data

(60) Provisional application No. 62/964,508, filed on Jan. 22, 2020.

(51) Int. Cl.
| | |
|---|---|
| *G02B 17/00* | (2006.01) |
| *G02B 17/06* | (2006.01) |
| *G02B 26/10* | (2006.01) |
| *G02B 27/01* | (2006.01) |
| *G02B 5/10* | (2006.01) |
| *G02B 5/136* | (2006.01) |

(52) U.S. Cl.
CPC ......... *G02B 17/004* (2013.01); *G02B 17/008* (2013.01); *G02B 17/0605* (2013.01); *G02B 17/0647* (2013.01); *G02B 26/101* (2013.01); *G02B 27/0172* (2013.01); *G02B 5/10* (2013.01); *G02B 5/136* (2013.01)

(58) Field of Classification Search
CPC .......... G02B 17/004; G02B 17/008; G02B 17/0605; G02B 17/0647; G02B 26/101; G02B 27/0172; G02B 5/10; G02B 5/136
See application file for complete search history.

(56) References Cited

U.S. PATENT DOCUMENTS

| | | | |
|---|---|---|---|
| 2,771,813 A | * | 11/1956 | Mihalyi ................. G03B 41/06 352/108 |
| 3,748,015 A | | 7/1973 | Offner |
| 6,392,811 B1 | | 5/2002 | Lindau |
| 6,856,446 B2 | | 2/2005 | Dicarlo |
| 6,989,921 B2 | | 1/2006 | Bernstein et al. |
| 7,071,594 B1 | | 7/2006 | Yan et al. |
| 8,531,750 B2 | | 9/2013 | Kessler |

(Continued)

FOREIGN PATENT DOCUMENTS

| WO | WO-8203924 A | * 11/1982 | ........... G02B 17/008 |
|---|---|---|---|
| WO | 2013110665 A1 | 8/2013 | |

(Continued)

OTHER PUBLICATIONS

Application No. PCT/US2021/013676, "International Preliminary Report on Patentability", dated Jul. 28, 2022, 11 pages.

(Continued)

*Primary Examiner* — George G. King
(74) *Attorney, Agent, or Firm* — KILPATRICK TOWNSEND & STOCKTON LLP

(57) ABSTRACT

Described are two mirror scanning projectors employing a collimated laser beam directed to a first mirror that scans in one direction, an optical relay system, and a second mirror that scans in a perpendicular direction from the first mirror to provide two dimensional scanning of the laser beam.

18 Claims, 13 Drawing Sheets

(56) References Cited

U.S. PATENT DOCUMENTS

| | | |
|---|---|---|
| 8,817,379 B2 | 8/2014 | Saeedi et al. |
| 9,063,549 B1 | 6/2015 | Pennecot et al. |
| 9,740,003 B2 | 8/2017 | Potsaid et al. |
| 10,656,423 B2 | 5/2020 | Kim et al. |
| 11,796,791 B2 | 10/2023 | Gamet et al. |
| 2002/0050744 A1 | 5/2002 | Bernstein et al. |
| 2005/0253055 A1 | 11/2005 | Sprague et al. |
| 2007/0047105 A1 | 3/2007 | Lerner et al. |
| 2007/0216982 A1 | 9/2007 | Sanders et al. |
| 2007/0273794 A1 | 11/2007 | Sprague et al. |
| 2009/0027748 A1 | 1/2009 | Sprague et al. |
| 2009/0067033 A1 | 3/2009 | Kajino et al. |
| 2009/0284816 A1 | 11/2009 | Davis et al. |
| 2011/0025930 A1 | 2/2011 | Sprague et al. |
| 2011/0122101 A1 | 5/2011 | Kurozuka |
| 2014/0268268 A1 | 9/2014 | Kin et al. |
| 2016/0187643 A1 | 6/2016 | Booth et al. |
| 2017/0102538 A1 | 4/2017 | Gamet et al. |
| 2018/0176524 A1 | 6/2018 | Kobori et al. |
| 2018/0299666 A1 | 10/2018 | Nestorovic et al. |
| 2019/0278076 A1 | 9/2019 | Chen et al. |
| 2019/0331774 A1 | 10/2019 | Jackson |
| 2021/0191106 A1 | 6/2021 | Sugimoto et al. |
| 2021/0223541 A1 | 7/2021 | Gamet et al. |

FOREIGN PATENT DOCUMENTS

| | | |
|---|---|---|
| WO | 2021146583 A1 | 7/2021 |
| WO | 2021150781 A1 | 7/2021 |

OTHER PUBLICATIONS

Application No. PCT/US2021/014455, "International Preliminary Report on Patentability", dated Aug. 4, 2022, 10 pages.

International Application No. PCT/US2021/013676, International Search Report and Written Opinion dated Apr. 8, 2021, 14 pages.

International Application No. PCT/US2021/014455, International Search Report and Written Opinion dated Apr. 9, 2021, 11 pages.

European Patent Application No. 21741743.5, "Extended European Search Report",dated Jun. 27, 2023, 5 pages.

U.S. Appl. No. 17/150,694 , "Notice of Allowance", dated Jun. 20, 2023, 8 pages.

EP21744097.3, "Extended European Search Report", Jan. 5, 2024, 14 pages.

U.S. Appl. No. 17/338,402 , "Notice of Allowance", Apr. 16, 2024, 9 pages.

* cited by examiner

TWO MIRROR SCANNING RELAY OPTICS

CROSS-REFERENCE TO RELATED APPLICATIONS

This application claims the benefit of and priority to U.S. Provisional Application No. 62/964,508, filed on Jan. 22, 2020, which is hereby incorporated by reference in its entirety.

BACKGROUND

Digital micromirror devices have been used in image projection systems. For example, U.S. Pat. No. 6,856,446 describes a micromirror array in which many individually hinged and controllable micromirror elements can be used to control the direction of reflected light to project an array of digital pixels. These devices often require use of a color wheel or three individual pixel arrays for different colors to project a full color image, and generally use large and high intensity light sources, limiting the compactness of the projection systems.

SUMMARY

The present disclosure relates to optical projection systems and their use for image projection. The disclosed optical scanning systems include an optical relay system comprising a plurality of mirrors providing a folded configuration, which can allow for optical communication between two scanning mirror devices, such are scanning microelectromechanical system mirrors, in a compact and space-saving configuration.

In a first aspect, optical projection systems are described herein. In some examples, an optical projection system of this aspect may comprise a source of collimated light; a first microelectromechanical system mirror positioned to receive collimated light from the source, the first microelectromechanical system mirror having a first scan axis, and the first microelectromechanical system mirror configured or positioned to reflect collimated light from the source along a first range of propagation directions about the first scan axis; an optical relay system positioned to receive collimated light from the first microelectromechanical system mirror along the first range of propagation directions about the first scan axis and direct reflected collimated light; a second microelectromechanical system mirror positioned to receive collimated light from the optical relay system, the second microelectromechanical system mirror having a second scan axis oriented perpendicular to the first scan axis, and the second microelectromechanical system mirror configured or positioned to reflect collimated light from the optical relay systems at a second range of propagation directions about the second scan axis. Optionally, an optical projection system of this aspect may further comprise an eyepiece positioned to receive light reflected from the second microelectromechanical system mirror.

Microelectromechanical system mirrors may also be referred to herein as scanning mirrors and may comprise microfabricated devices with a reflective surface that is configured, adapted, or structured to change position over time. The scanning mirrors may oscillate about a scan axis, for example, by adjusting a tilt angle of the reflective surface. In some examples, the first microelectromechanical system mirror has a first scan frequency of 1 kHz to about 10 MHz. In some examples, the second microelectromechanical system mirror has a second scan frequency of from about 15 Hz to about 500 Hz. Example microelectromechanical system mirrors are described, for example, by U.S. Provisional Application No. 62/962,168, filed on Jan. 16, 2020, and U.S. Provisional Application No. 63/058,384, filed on Jul. 29, 2020, both of which are hereby incorporated by reference in their entireties.

A variety of different configurations can be used for the optical relays used in the optical projection systems described herein. In some examples, the optical relay system comprises one or more planar mirrors, one or more convex mirrors, or one or more concave mirrors. More specifically, the optical relay system may comprise one or more cylindrical mirrors, one or more spherical mirrors, one or more toroidal mirrors, or one or more aspherical mirrors. The mirrors of the optical relay system may be arranged in a configuration to allow for three or more reflections, which may be referred to in some cases as a single-pass relay or a single-pass configuration. The mirrors of the optical relay system may be arranged in a configuration to allow for five or more reflections, which may be referred to in some cases as a double-pass relay or a double-pass configuration.

In some examples, the optical relay system comprises a single-pass relay or a double-pass relay having one or more cylindrical mirrors. In some examples, the optical relay system comprises a single-pass relay or a double-pass relay having a split cylindrical element comprising a first component, a second component, and a third component. Optionally, the third component has a different radius of curvature or focal length from the first component and the second component. Optionally, the first component and the second component have different radii of curvature or focal lengths. In some examples, the optical relay system may exhibit an afocal configuration. In some examples, the optical relay system is configured or positioned to receive collimated light, generate non-collimated light, and output collimated light.

In some examples, the optical projection system comprises a single-pass relay or a double-pass relay having a cylindrical mirror and a toroidal mirror or an aspheric mirror. In some cases, the mirrors of an optical relay may have one axis with cylindrical symmetry and another axis with toroidal or aspheric configurations.

In some examples, the optical relay system comprises a single-pass relay or a double-pass relay with a tilted configuration. Such a configuration may mean that the collimated light entering the optical relay may be arranged at an angle with respect to an arrangement of the mirrors of the optical relay. For example, the collimated light may be directed towards a center of the optical relay along an axis perpendicular to the range of propagation angles from the first microelectromechanical system mirror.

In some examples, the optical relay system comprises a single-pass relay or a double-pass relay exhibiting angular magnification. In other examples, the optical relay system comprises a single-pass relay or a double-pass relay without any angular magnification.

Optionally, the first microelectromechanical system mirror includes an actuator controllable to induce movement in the first microelectromechanical system mirror about the first scan axis. Optionally, the second microelectromechanical system mirror includes an actuator controllable to induce movement in the second microelectromechanical system mirror about the second scan axis.

In another aspect, methods for projecting images are described. In some examples, a method of this aspect comprises generating collimated light; directing the collimated light to a first scanning mirror, the first scanning mirror having a first scan axis and configured or arranged to reflect collimated light along a first range of propagation directions about the first scan axis; directing collimated light from the first scanning mirror to an optical relay system, the optical relay system configured to receive collimated light along the first range of propagation directions and reflect collimated light; and directing collimated light from the optical relay system to a second scanning mirror, the second scanning mirror having a second scan axis and configured or arranged to reflect collimated light along a second range of propagation directions about the second scan axis. In some examples, a method of this aspect may further comprising directing collimated light from the second scanning mirror to an eyepiece. The methods of this aspect may employ any of the optical projection systems described herein, including those described above.

In another aspect, head-mounted display systems are described herein. In some examples, a head-mounted display system of this aspect comprises any of the optical projection systems described herein; and an eyepiece comprising one or more optical components configured or positioned to receive and redirect light reflected by the second microelectromechanical system mirror to one or two eyes of a user. Optionally, light produced by the source of collimated light comprises light representative of virtual content that is to be presented to the user.

In some examples, an optical projection system or a head mounted display system may comprise control circuitry operatively coupled to the source of collimated light, the first microelectromechanical system mirror, and the second microelectromechanical system mirror. Optionally, the control circuitry is configured to display one or more images by synchronously: controlling the source of collimated light to emit collimated light corresponding to pixels of the one or more images; and controlling actuators of the first and second microelectromechanical system mirrors to induce movement in the first and second microelectromechanical system mirrors about the first and second scan axes, respectively.

Specific example methods are described below in the detailed description and figures. Further, additional features, benefits, and embodiments are described below in the detailed description, figures, and claims.

DETAILED DESCRIPTION

This application discloses optical projection systems employing a two mirror scanning configuration where collimated light is reflected from a first mirror that scans in one direction and is recombined on a second mirror that scans in a perpendicular direction to give a two-dimensional scan. The optics and element geometries and arrangements used by the disclosed optical scanning systems to achieve this function are compact, achromatic, and maintain a high degree of collimation.

The disclosed optical projection systems are useful for projecting two-dimensional and multi-dimensional images and videos. Methods of projecting light and images using optical projection systems are also disclosed. The disclosed optical projection systems can incorporate a collimated light source that emits light onto a first scanning mirror, an optical relay system to receive collimated light reflected from the first scanning mirror and direct relayed collimated light toward a second scanning mirror, which can further reflect output collimated light to an output plane, which can be an eyepiece of a head-mounted display system, for example.

The disclosed optical projection systems exhibit features providing benefits for two-dimensional optical scanning and image projection. For example, the optical projection systems can be compact or limited in size, such as by making use of folded optical relays in which incoming collimated light is reflected multiple times and optionally focused and defocused to generate output collimated light. Further, the optical relay systems can accommodate incoming light propagating along different directions, such as along a range of directions supported by tilting of a first scanning mirror about a first axis, and allow the output light to remain collimated and be received by a second scanning mirror, despite the variation in propagation direction due to changes in orientation of the first scanning about the first axis.

Figure 1:
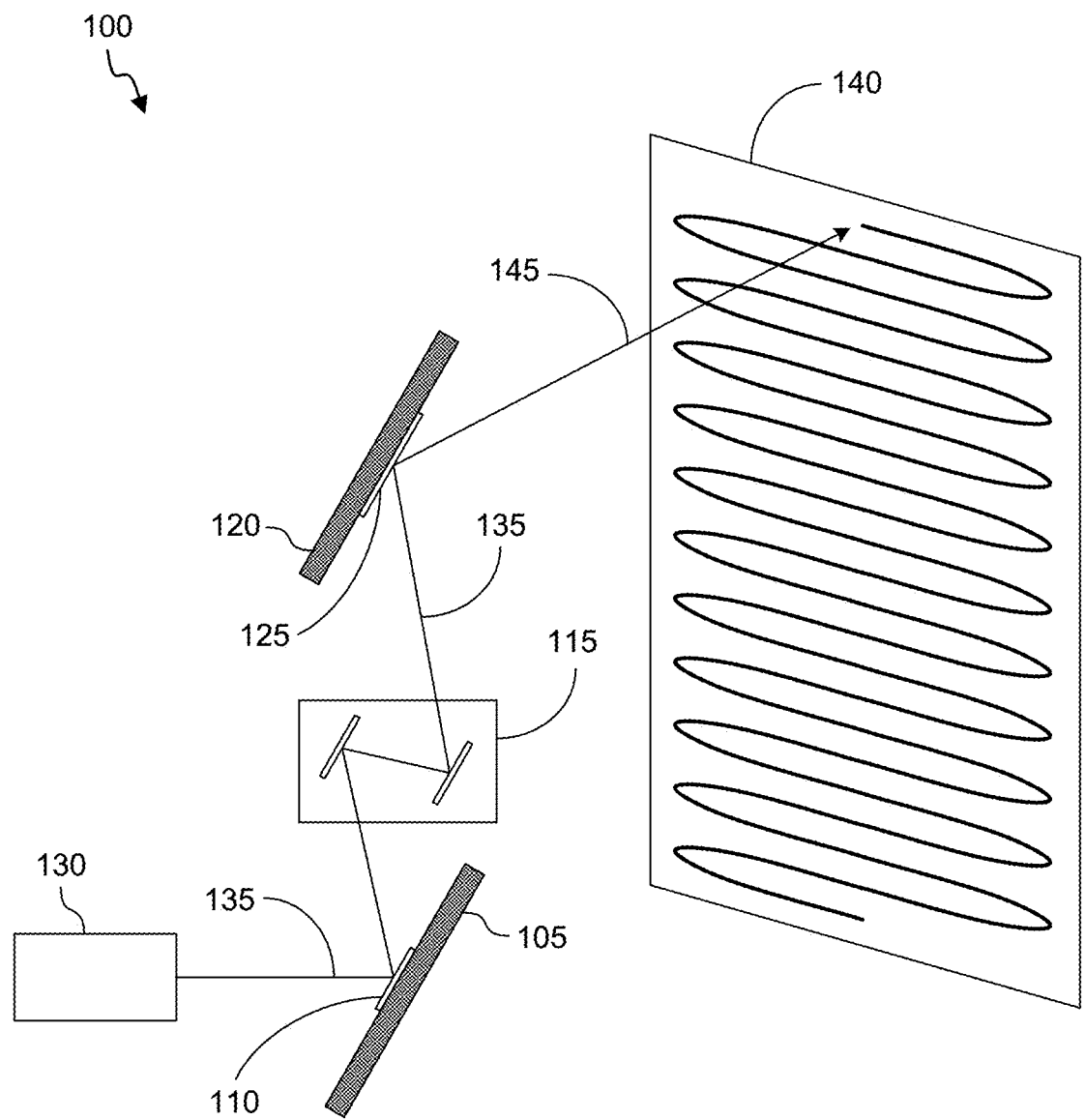
FIG. 1 provides a schematic illustration of an example optical projection system.

FIG. 1 provides a schematic illustration of an example optical projection system 100. Optical projection system 100 comprises a first scanning micromirror device 105, including a first reflector 110, an optical relay 115, and a second scanning micromirror device 120, including a second reflector 125. Image projection system 100 also includes a light source 130 arranged in optical communication with first reflector 110 to direct light 135 from light source 130 to first reflector 110, where it is reflected towards optical relay 120, which directs the light to second reflector 125 and, from there, output for projection. Motion of the first scanning micromirror device 105 and the second scanning micromirror device 120 can be driven in such a way to direct output reflected light 135 to a projection plane 140, which can be an eyepiece of a head-mounted display device or in optical communication such an eyepiece. By controlling the color, intensity, and timing of light 135 output by light source 130 with the oscillatory motion of the first scanning micromirror device 105 and the second scanning micromirror device 120, the output light 145 can generate an image at projection plane 140. With repeated scanning, a sequence of images and/or video may be projected.

In some examples, the first scanning micromirror device 105 can oscillate about a first axis so that output light 145 can form a series of horizontal (left-to-right and right-to-left) passes, while the second scanning micromirror device 120 can oscillate about a second axis so that output reflected light 145 can also oscillate vertically from top-to-bottom and/or from bottom-to-top across projection plane 140. The oscillation frequency along the horizontal direction can be very fast, such as in the range from 1 kHz to 10 MHz, for example. Some projection systems may use an oscillation pattern along the vertical direction that is a sawtooth or triangular shape, which can be useful for creating regularly spaced horizontal passes in one vertical direction (e.g., from top-to-bottom), though sinusoidal oscillations patterns may also be used. The oscillation frequency along the vertical direction can be slower, such as in the 15 Hz to 2 kHz range, for example. If only top-to-bottom repeated projections are desired, a blanking period can be used where no light is generated by light source 130 while the second scanning micromirror device 120 oscillates in the upward direction. In some cases, however, both top-to-bottom and bottom-to-top projections can be used. Blanking periods can also be used on the extremes of the horizontal dimension to avoid projection at the side edges of projection plane 140.

It will be appreciated that reference to horizontal (or left-to-right and right-to-left) directions and vertical (or bottom-to-top and top-to-bottom) are merely one example of labeling, referenced to the orientation of projection plane 140 shown in FIG. 1. Other configurations where horizontal and vertical direction labels are switched or where other labels are used are contemplated within the scope of the present disclosure. In some cases, the oscillation frequencies of the first scanning micromirror device 105 and second scanning micromirror devices can be opposite, such as where the oscillation frequency of the first scanning micromirror device 105 is slower, such as in the 15 Hz to 2 kHz range, while the oscillation frequency of the second scanning micromirror device 120 is faster, such as in the range from 1 kHz to 10 MHz, for example.

Optical projection system 100 can be a component of an optical projector, for example, which can be used to project still images or video images at a projection plane. In some cases, the optical projection system 100 can be a component of a head-mounted display device and/or used to couple projected light into an eyepiece, such as an eyepiece of a head-mounted display device. Projection plane 140 may correspond to an eyepiece or a user's retina, in some examples. Optical projection system 100 can optionally include other optics, such as mirrors, lenses, collimators, filters, gratings, or the like, which are not illustrated in FIG. 1, but can be positioned in the optical path between the light source 130 and the projection plane 140, for example. Light source 130 can be a single or multi-color light source and can include a light emitting diode or laser source, for example, which can be output switchable or modulatable at a high rate, such as up to 100 MHz, for example. Optionally, light source 130 can comprise or correspond to multiple individually modulatable light sources, such as laser diodes outputting different colors (e.g., red, green, blue).

Figure 2:
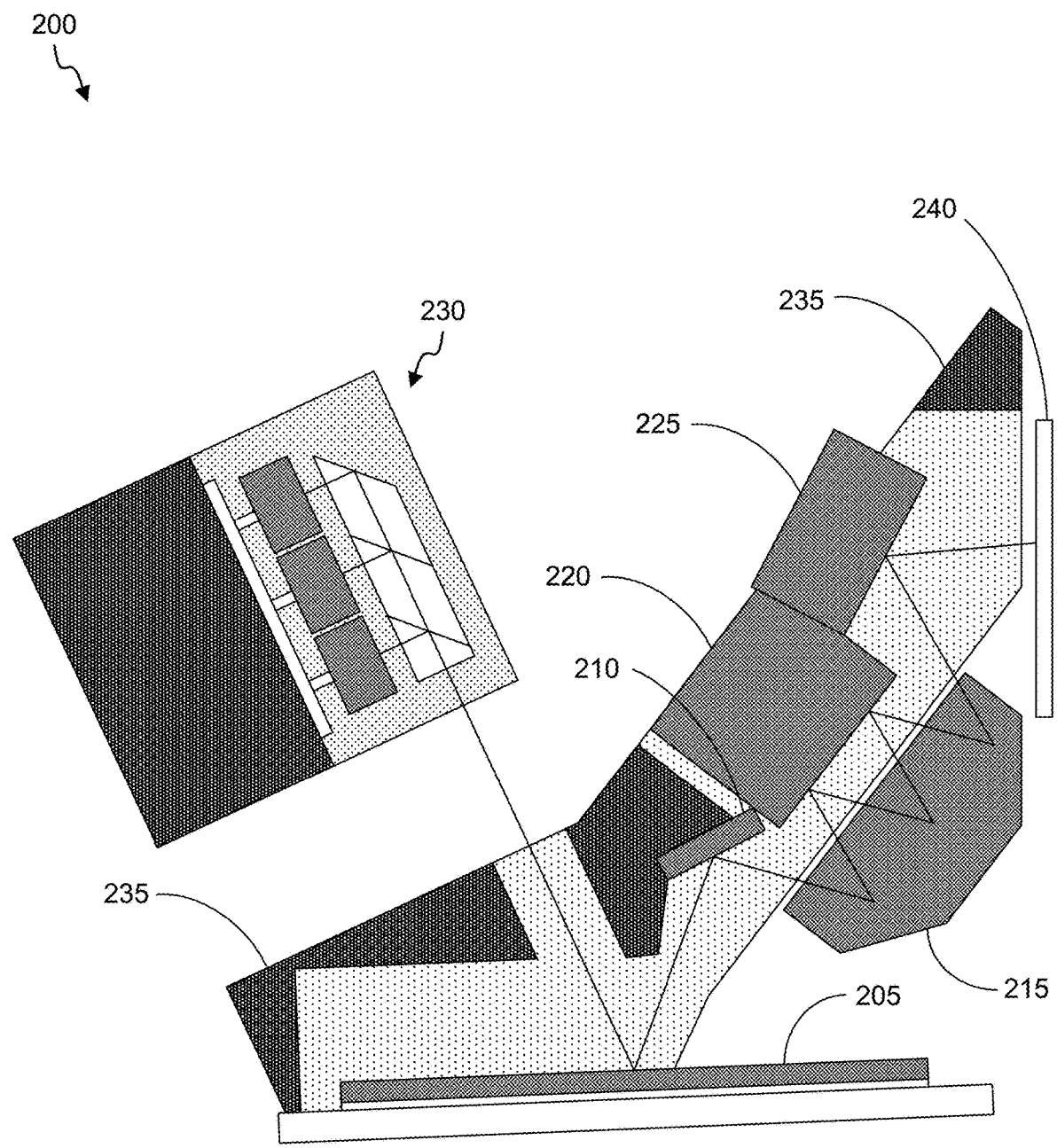
FIG. 2 provides a schematic cross-sectional illustration of an example optical projection system.

FIG. 2 provides a schematic illustration of further details of an example optical projection system 200. Optical projection system 200 can comprise various individual components, which can be independently fabricated and assembled. As illustrated, optical project system 200 comprises a first microelectromechanical system mirror 205, an optical relay system comprising a first mirror 210, a second mirror 215, and a third mirror 220, a second microelectromechanical system mirror 225, and a source 230 of collimated light. A chassis 235 may be used to position components in appropriate positions relative to one another. The optical relay system is positioned to receive collimated light output from source 230 and reflected from the first microelectromechanical system mirror 210 and relay collimated light to second microelectromechanical system mirror 225.

In the configuration illustrated, first mirror 210 comprises a planar mirror, second mirror 215 comprises a concave cylindrical mirror, and third mirror 220 comprises a convex cylindrical mirror. Optionally, second mirror 215 comprises a convex cylindrical mirror and third mirror 220 comprises a concave cylindrical mirror. Other mirror configurations may also be employed, such as where second mirror has concave regions, planar regions, and/or convex regions, or where third mirror has concave regions, planar regions, and/or convex regions. In some configurations, planar mirrors, cylindrical mirrors, spherical mirrors, toroidal mirrors, and/or aspherical mirrors may be used in the optical relay system.

The first microelectromechanical system mirror 205 can have a first scan axis to allow for collimated light from source 230 to be reflected along a first range of propagation directions about the first scan axis. The use of concave and convex cylindrical mirrors for second mirror 215 and third mirror 220 can allow, for example, collimated light reflected by first mirror 210 to be reflected and focused by and between second mirror 215 and third mirror 220 in such a way for the light leaving third mirror 220, directed towards second microelectromechanical system mirror 225, to be collimated. In some examples, light reflected from the first microelectromechanical system mirror 205 can undergo one or multiple reflections at the optical relay before reaching the second microelectromechanical system mirror 225, such as 2, 3, 4, 5, 6, or more reflections. In some examples, light can be reflected between the second mirror 215 and the third mirror 215 multiple times before reaching the second microelectromechanical system mirror 225. As shown, light is reflected 5 times between the second mirror 215 and the third mirror 215 multiple times before reaching the second microelectromechanical system mirror 225.

The second microelectromechanical system mirror 225 can have a second scan axis, such as oriented perpendicular to the first scan axis, which can direct output light towards an eyepiece 240. In one example, the first scan axis can be arranged in the plane of the illustration shown in FIG. 2, such that the reflection of light from the first microelectromechanical system mirror 205 can vary in directions out of plane of the image of the illustration shown in FIG. 2, while the second scan axis can be arranged perpendicular to the plane of the illustration shown in FIG. 2, such that reflection of light from the second microelectromechanical system mirror 225 can vary in directions in the plane of the image of the illustration shown in FIG. 2.

Figure 3:
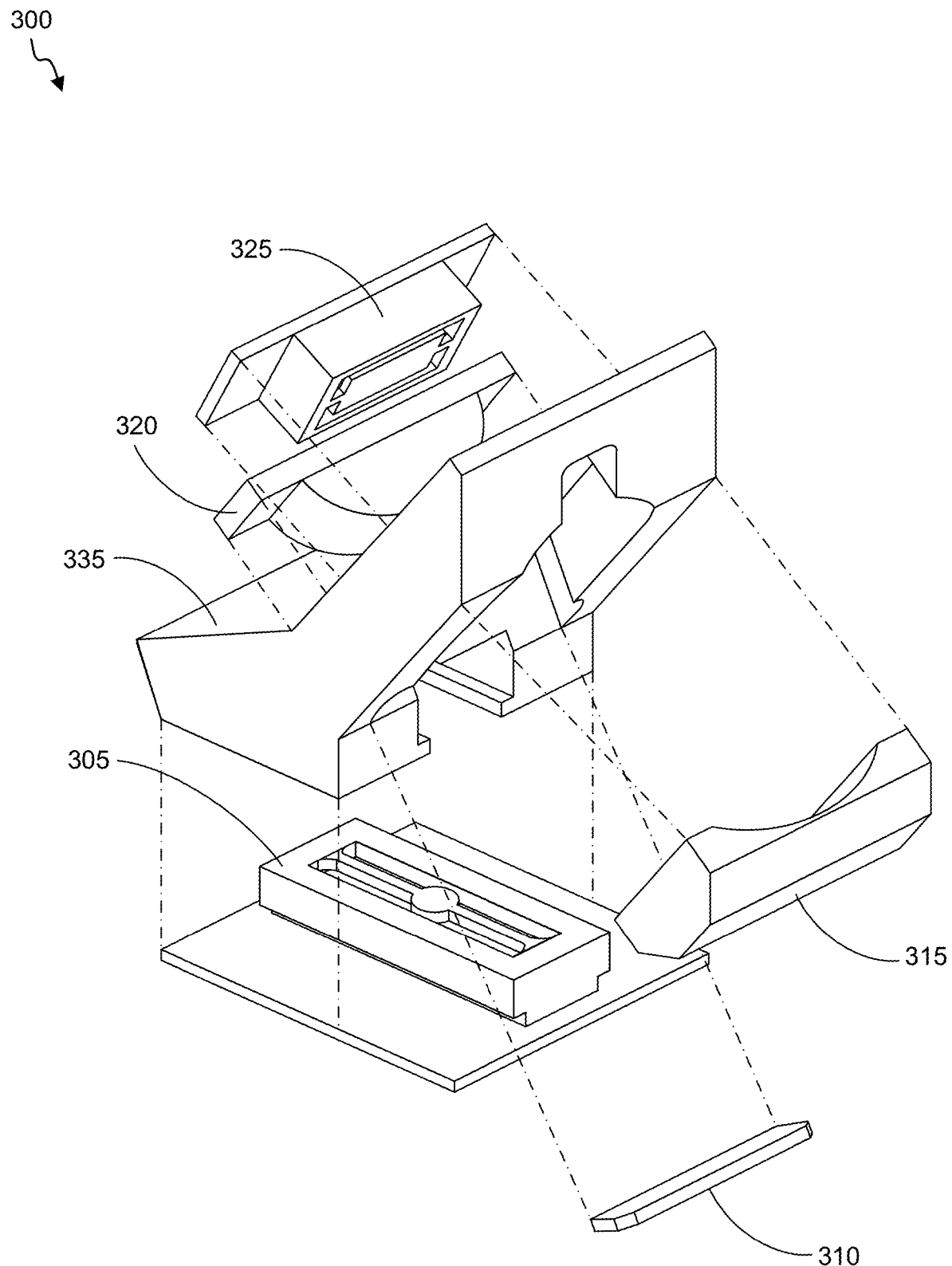
FIG. 3 provides a perspective exploded-view illustration of an example optical projection system.

FIG. 3 provides an exploded perspective schematic illustration of another example optical projection system 300, which may be the same or different as optical projection system 200 depicted in FIG. 2. Optical projection system 300 comprises a first microelectromechanical system mirror 305, an optical relay system comprising a first mirror 310, a second mirror 315, and a third mirror 320, a second microelectromechanical system mirror 325, and a chassis 335. A source of collimated light may be included in optical projection system 300, but is not illustrated in FIG. 3 so as not to obscure other details.

In the configuration illustrated, first mirror 310 comprises a planar mirror, second mirror 315 comprises a concave cylindrical mirror, and third mirror 320 comprises a convex cylindrical mirror. Each of first mirror 310, second mirror 315, third mirror 320 and second microelectromechanical system mirror 325 may be coupled chassis 335, such as with a removable or fixed coupling configuration. Chassis 335 may be optionally coupled to a base 340. First microelectromechanical system mirror 305 may optionally be coupled to base 340 or to chassis 335.

Figure 4A:
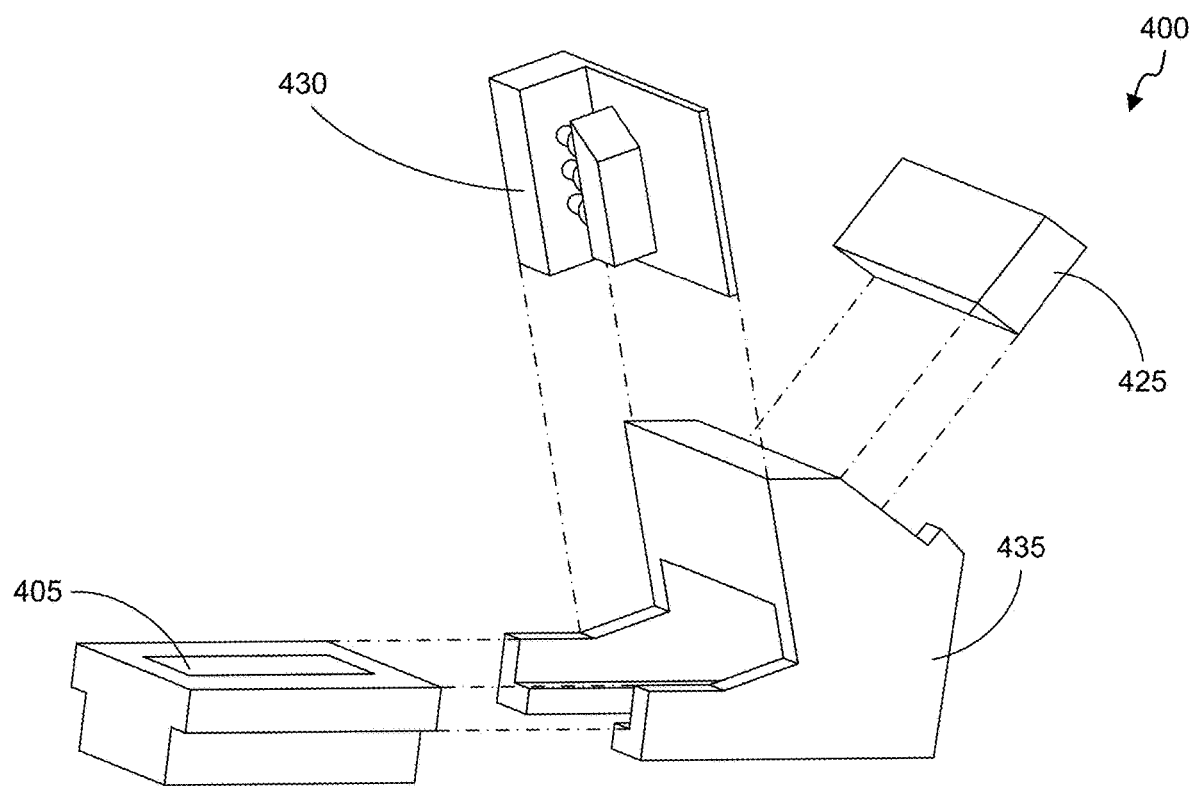
FIG. 4A provides a perspective exploded-view illustration of an example optical projection system and FIG. 4B provides a perspective assembled-view illustration of an example optical projection system.
Figure 4B:
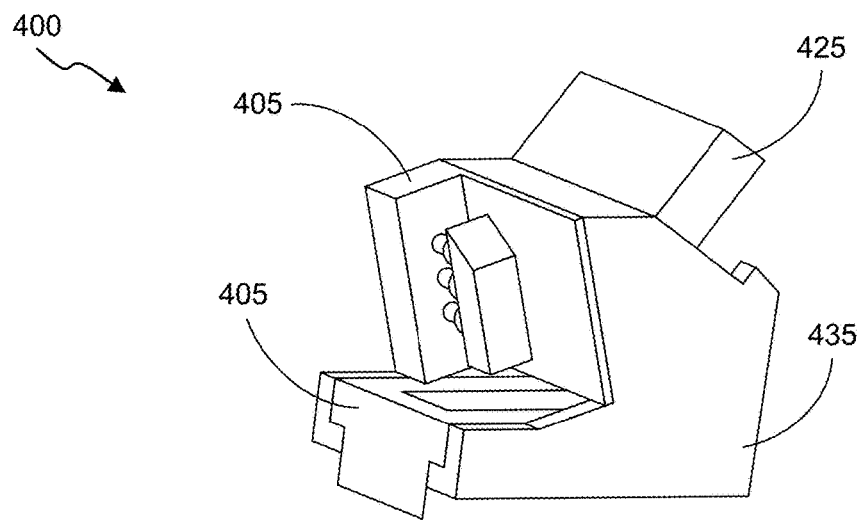

FIG. 4A provides an exploded perspective schematic illustration of another example optical projection system 400 and FIG. 4B provides an assembled perspective schematic illustration of optical projection system 400. Optical projection system 400 may be the same as or different from optical projection system 200 depicted in FIG. 2 and/or optical projection system 300 depicted in FIG. 3. Optical projection system 400 comprises a first microelectromechanical system mirror 405, a second microelectromechanical system mirror 425, a source of collimated light 430, and a chassis 435. An optical relay may be included in optical projection system 400, but is not illustrated in FIG. 4A or FIG. 4B so as not to obscure other details.

In the configuration illustrated, first microelectromechanical system mirror 405, second microelectromechanical system mirror 425, and source of collimated light 430 all couple to chassis 435 in a configuration to provide suitable optical alignment between components. Components of an optical relay may be positioned at an interior of chassis 435 in positions not visible from the perspective views shown in FIG. 4A or FIG. 4B.

As noted above, a variety of mirror configurations may be used in an optical relay system. For example, the optical relay system may comprise one or more planar mirrors, convex mirrors, or concave mirrors. The mirrors of optical relay system may be cylindrical mirrors, spherical mirrors, toroidal mirrors, or aspherical mirrors. The use of such mirrors in an optical relay system may allow for the optical relay system to, in a compact configuration, allow for a spread of input angles of incident light, such as reflected from a first scanning mirror (e.g., a microelectromechanical system mirror), and relay the incident light via one or multiple reflections and/or focusing, to a second scanning mirror without introducing undesirable optical effects. The incident light to the optical relay can exhibit a variety of input angles, depending on a tilt angle of the first scanning mirror, so the optical relay system must be large enough to or exhibit an optical configuration that accommodates a spread of the light as it passes through the optical relay, but still direct the light to the second scanning mirror.

A variety of different optical relay system configurations may be useful for achieving such a configuration. For example, in some cases, the optical relay system comprises an afocal double pass relay having one or more cylindrical mirrors. In some cases, one or more of the cylindrical mirrors may be split such as with one or more components having different radii of curvature from one another. The mirrors in an optical relay system may be concentric or non-concentric.

Figure 5:
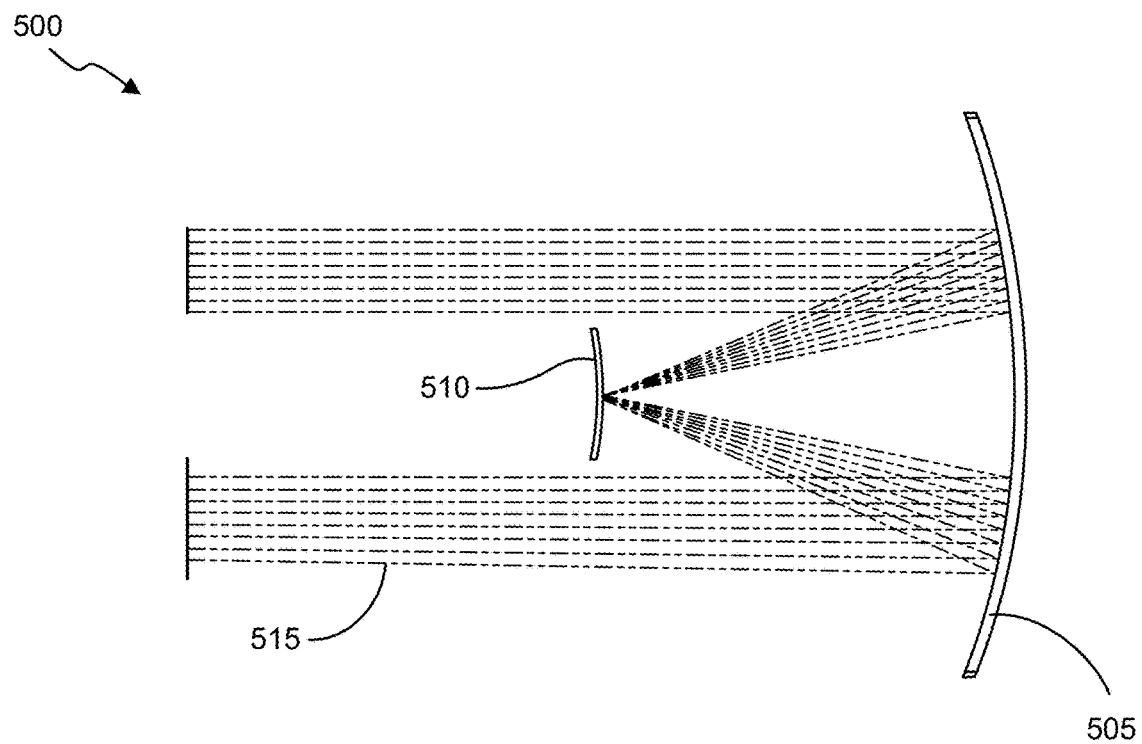
FIG. 5 provides a schematic illustration of a single-pass optical relay comprising concentric cylindrical mirrors.

Optical relays useful with the optical projection systems described herein include those that generate an image of an object at a shifted position in space. Offner Relay type configurations may be used, such as described in U.S. Pat. No. 3,748,015, hereby incorporated by reference. FIG. 5 depicts an example configuration of a two-mirror optical relay 500 including a first mirror 505 and a second mirror 510, which are concentric in the configuration shown, meaning their focal points are aligned, and provides a cross-sectional view. Collimated light 515 is accepted as an input to optical relay 500. First mirror 505 reflects and focuses light 515 toward second mirror 510, which defocuses light 515 toward first mirror 505, which then output collimated light 515 once again. In this configuration, three reflections, two at first mirror 505 and one at second mirror 510, shift and redirect collimated light in space. This case may be referred to as a "single-pass" configuration, and may employ cylindrical mirrors, for example. In the case of cylindrical mirrors, the input light 515 may have a distribution of input angles in directions out of the plane of the illustration, based on the scan axis of a scanning micromirror being in the plane of the illustration. In some cases, additional optical components may be included in optical relay 500 beyond those shown in FIG. 5, such as additional mirrors, and lenses, filters, or the like.

Figure 6:
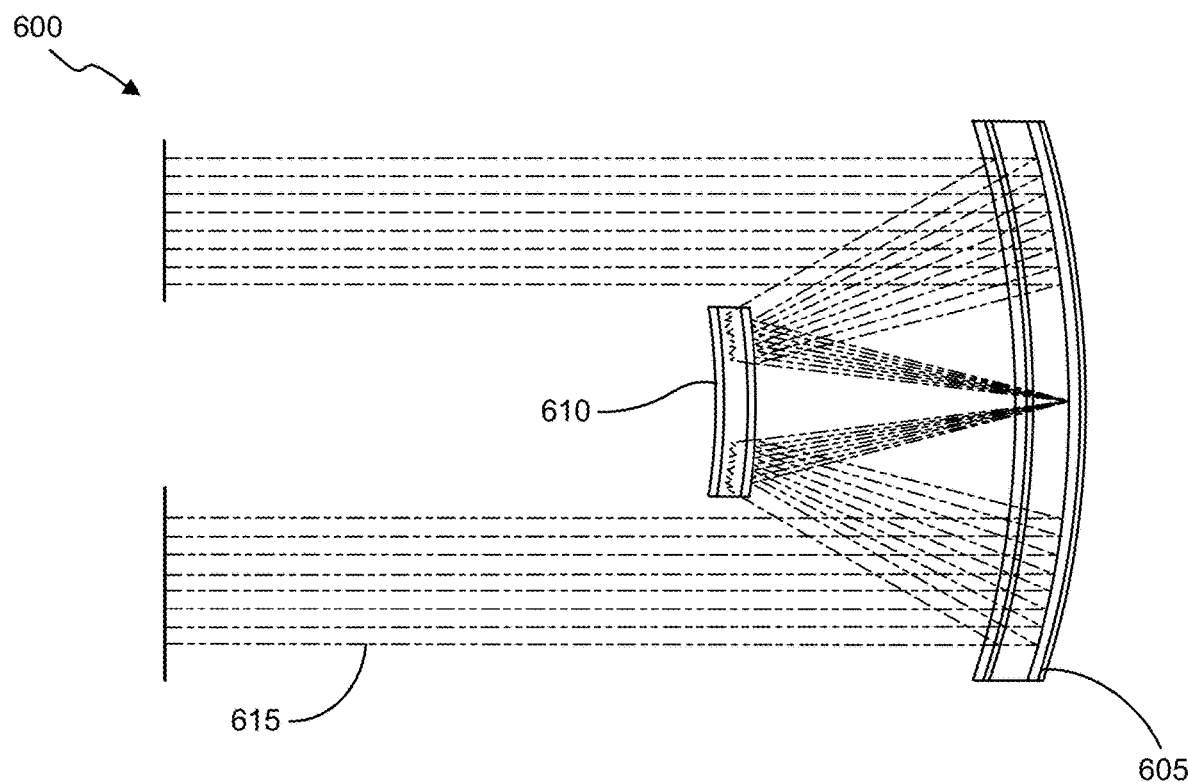
FIG. 6 provides a schematic illustration of a double-pass optical relay comprising concentric cylindrical mirrors.

FIG. 6 depicts an example configuration of a two mirror optical relay 600 including a first mirror 605 and a second mirror 610, which are concentric in the configuration shown, meaning their focal points are aligned, and provides a slight perspective view. Collimated light 615 is accepted as an input to optical relay 600. In this configuration, five reflections, three at first mirror 605 and two at second mirror 610, shift, focus, defocus, and redirect collimated light in space. This case may be referred to as a "double-pass" configuration, and may again employ cylindrical mirrors, for example.

In the configurations shown in FIGS. 5-6, the collimated light is parallel to an axis passing through the focal points of the mirrors. Other cases may use a tilted arrangement, such as where the collimated light is arranged in a configuration not parallel to the axis passing through the focal points of the mirrors.

Figure 7:
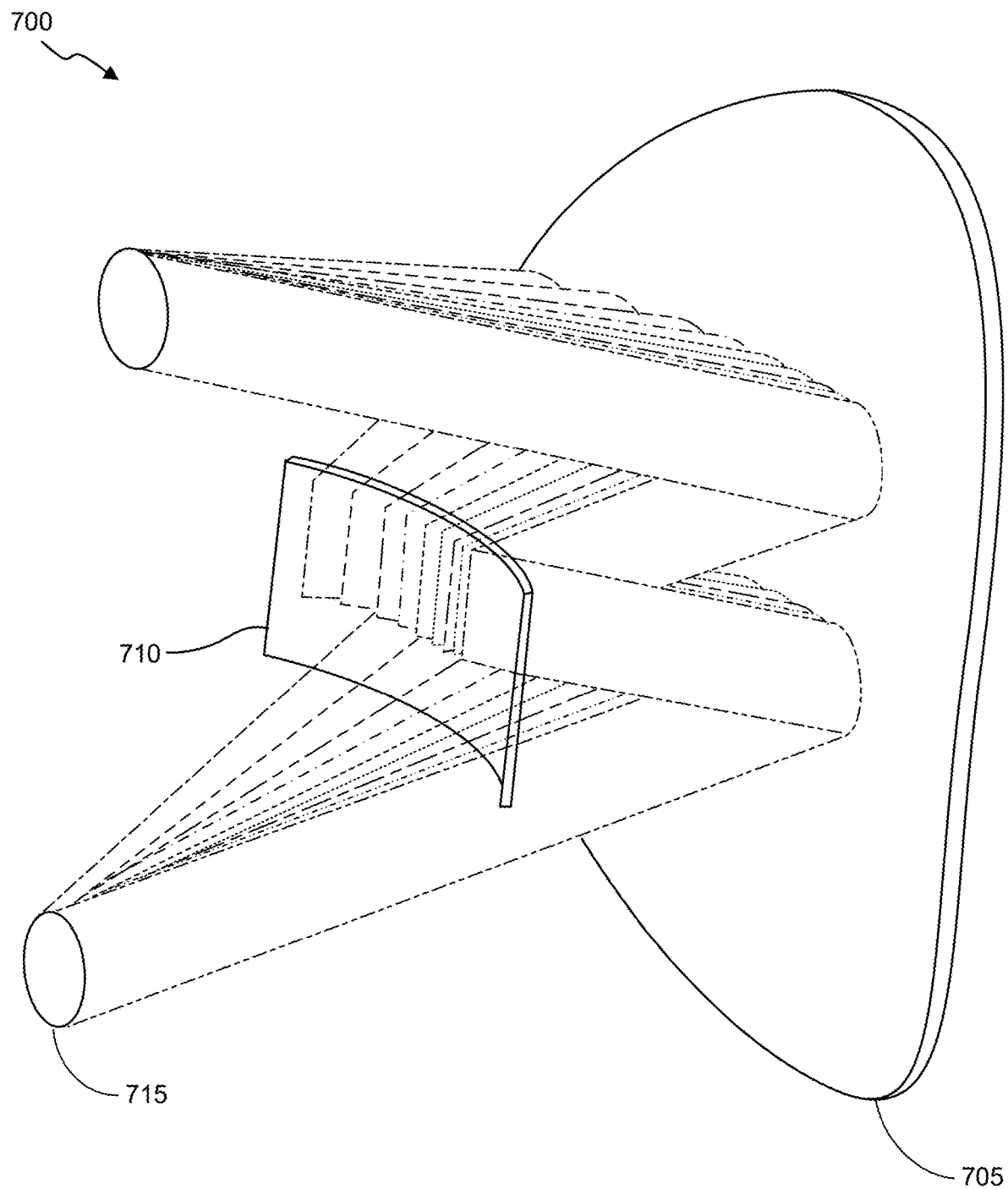
FIG. 7 provides a three-dimensional rendering of a single-pass optical relay comprising concentric cylindrical mirrors with a tilted entry angle for input light.

FIG. 7 depicts an example three-dimensional rendering of a two-mirror optical relay 700 similar to optical relay 500 shown in FIG. 5 using cylindrical mirrors, to show the different paths input light 715 may take based on a spread of input angles for a single-pass configuration. Optical relay 700 includes a first mirror 705 and a second mirror 710, which are concentric in the configuration shown, meaning their focal points are aligned. FIG. 7 illustrates how the light 715 may come to a line focus at second mirror 715. In the case shown in FIG. 7, input light 715 has a tilted configuration, where it is not propagating directly horizontally towards first mirror 705, but propagates at an angle of about 15 degrees from horizontal, which may be due to a tilt in the scan axis of a scanning mirror providing input light 715. Such a configuration may advantageously ensure an overlap of exit pupils.

Figure 8:
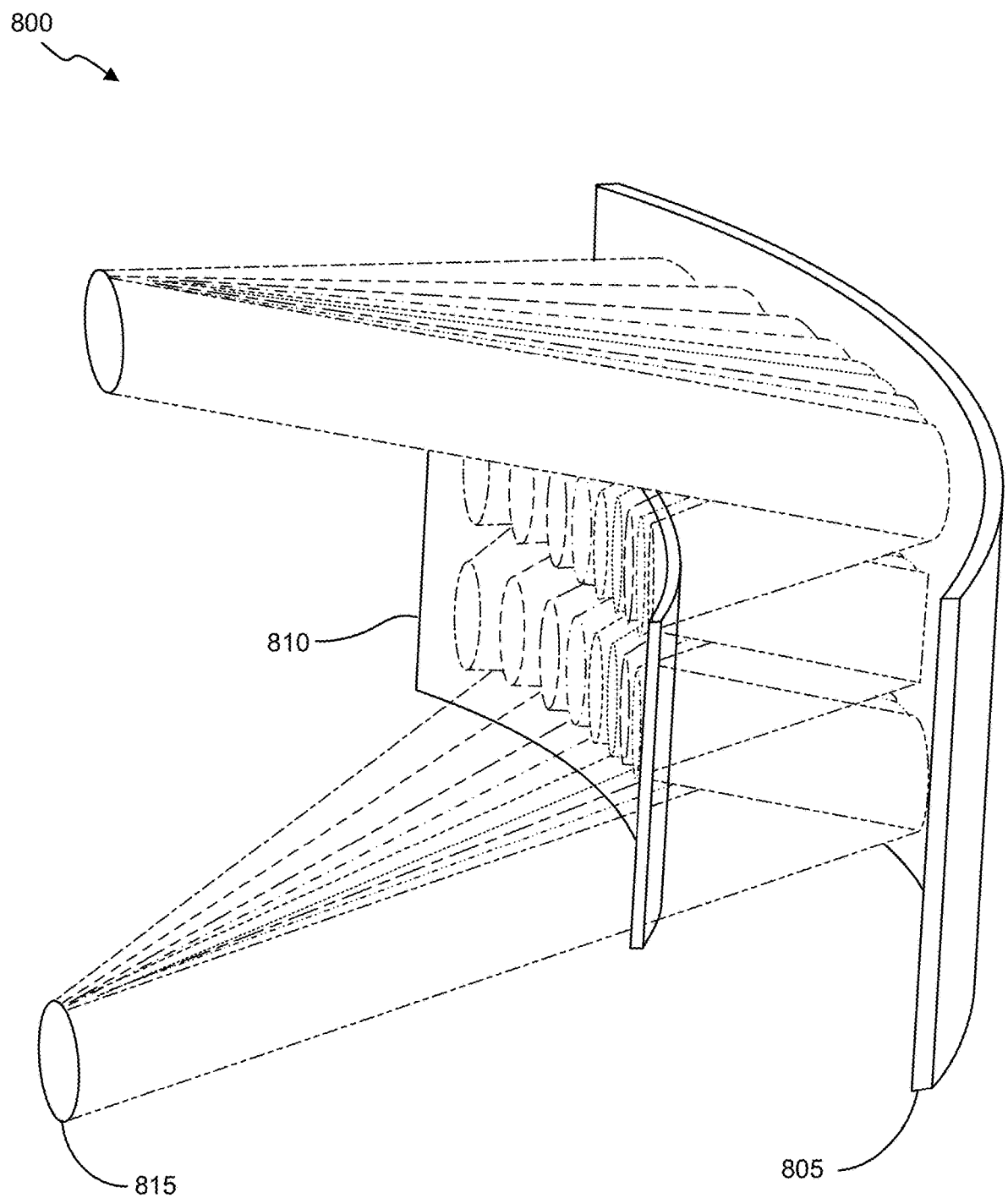
FIG. 8 provides a three-dimensional rendering of a double-pass optical relay comprising concentric cylindrical mirrors with a tilted entry angle for input light.

FIG. 8 depicts an example three-dimensional rendering of a two-mirror optical relay 800 similar to optical relay 800 shown in FIG. 6 using cylindrical mirrors, to show the different paths input light 815 may take based on a spread of input angles for a double-pass configuration. Optical relay 800 includes a first mirror 805 and a second mirror 810, which are concentric in the configuration shown. In the case shown in FIG. 8, input light 815 has a tilted configuration, where it is not propagating directly horizontally towards first mirror 805, but propagates at an angle of about 15 degrees from horizontal, which may be due to a tilt in the scan axis of a scanning mirror providing input light 815. Such a configuration may advantageously ensure an overlap of exit pupils. Advantageously, cylindrical mirror systems like those shown in FIGS. 5-8 are useful for reimaging the beams in the plane of the spread of scan angles, while leaving the beams unaffected in the perpendicular direction, as shown by the line focus evident in FIGS. 7 and FIG. 8.

Figure 9A:
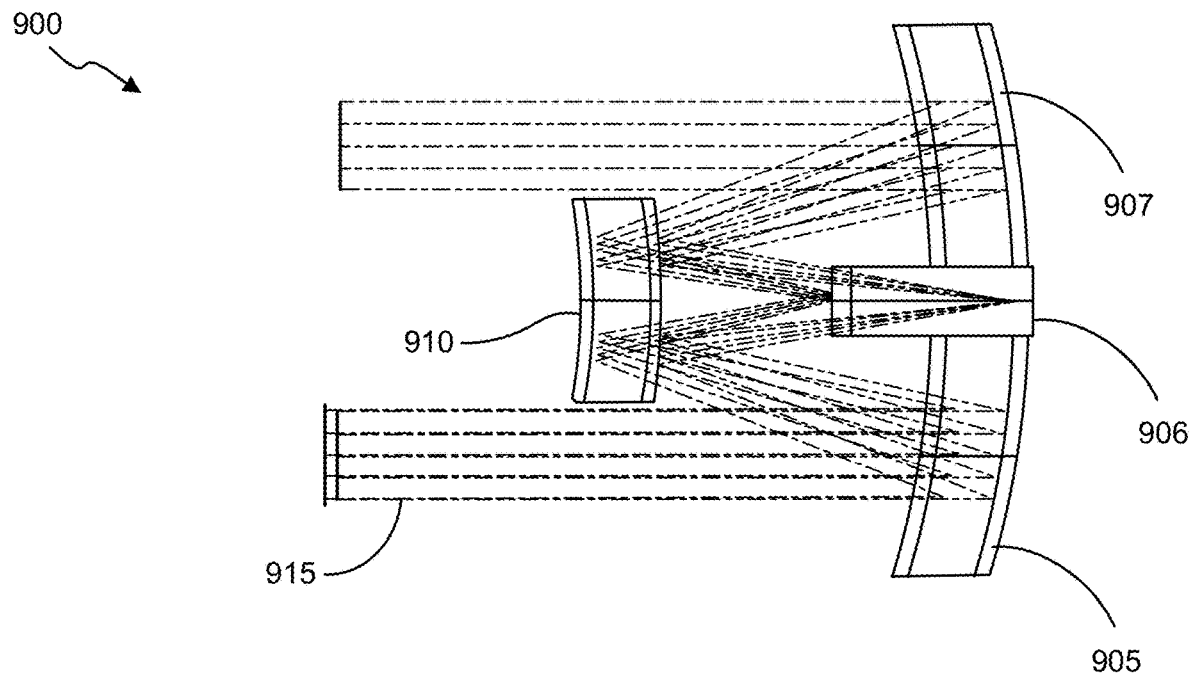
FIG. 9A and FIG. 9B provides schematic illustrations of a double-pass optical relay comprising concentric cylindrical mirrors, with one mirror having a split configuration.
Figure 9B:
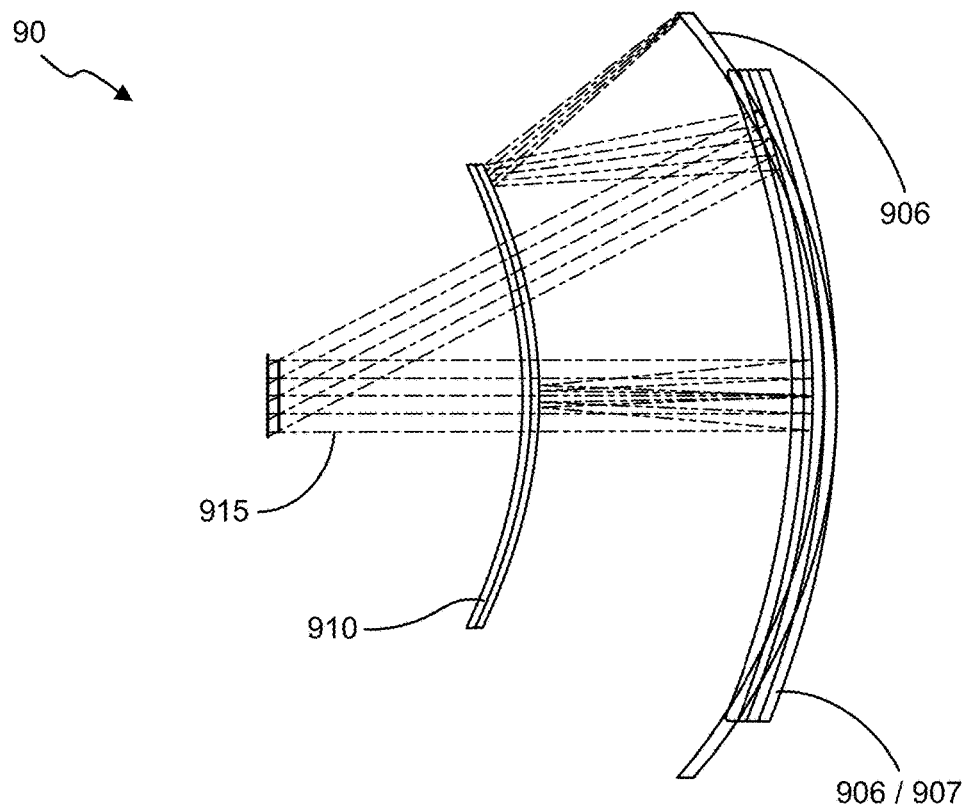

In the double-pass configuration shown in FIG. 6, light 615 comes to a focus at the center of first mirror 605. This can provide an opportunity to control the angle of the light by splitting first mirror 605 into multiple components and adjusting the angle where the light is focused. As an example, FIG. 9A and FIG. 9B depict a optical relay 900 with a configuration where the first mirror is split into multiple components 905, 906, and 907. FIG. 9A shows a slight perspective view of optical relay 900, oriented where the scan axis of a first scanning mirror device is in the plane of the illustration, and FIG. 9B shows a top view at about 90 degrees to the view shown in FIG. 9A. Collimated light 915 first interacts with first mirror component 905, where it is reflected to second mirror 910, which in turn reflects light 915 to first mirror component 906. From there, light 915 is reflected to second mirror 910, which in turn reflects light 915 to first mirror component 907. The sizes of first mirror components 905, 906, and 907 needs to be sufficient to contain all the input angles for light 915 to provide an overlapping output. An advantage of this configuration is that by inserting first mirror component 906 between components 905 and 906, the angle of the different input beams of light 915 can be easily changed so that they overlap, while the second mirror 910 and first mirror components 905 and 906 can be used to maintain good collimation. Advantageously, optical relay 900 may limit or minimize chromatic aberration. Since first mirror component 906 interacts with light 915 at a focus, first mirror component 906 can be a planar mirror, a spherical mirror, or a cylindrical mirror without loss of performance.

Figure 10A:
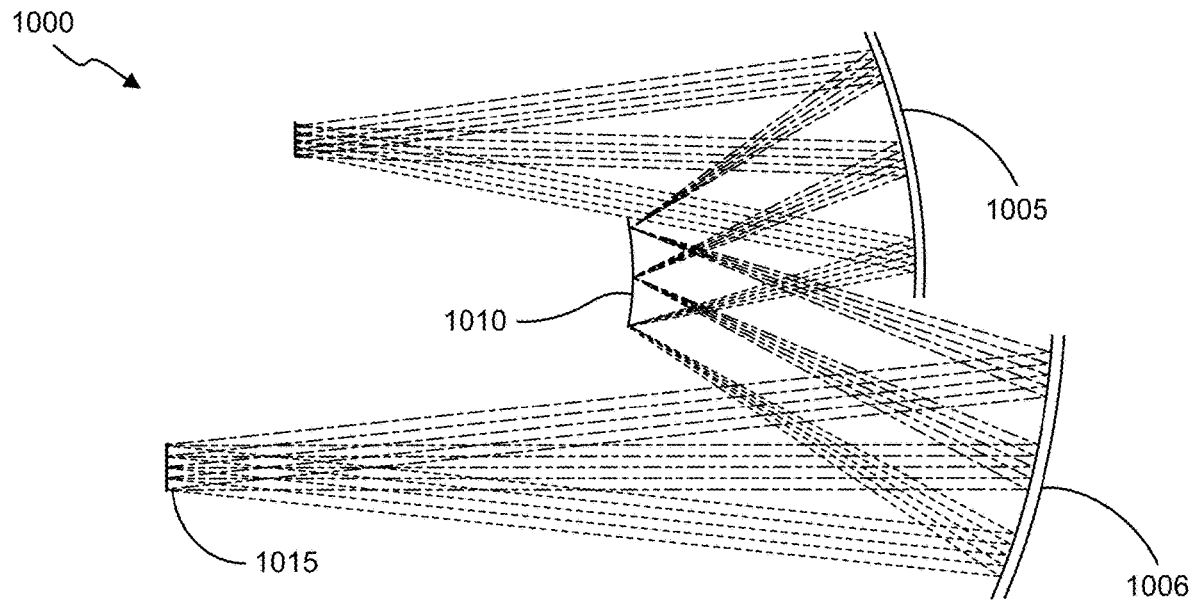
FIG. 10A provides a schematic illustration of a single-pass optical relay comprising three cylindrical mirrors.
Figure 10B:
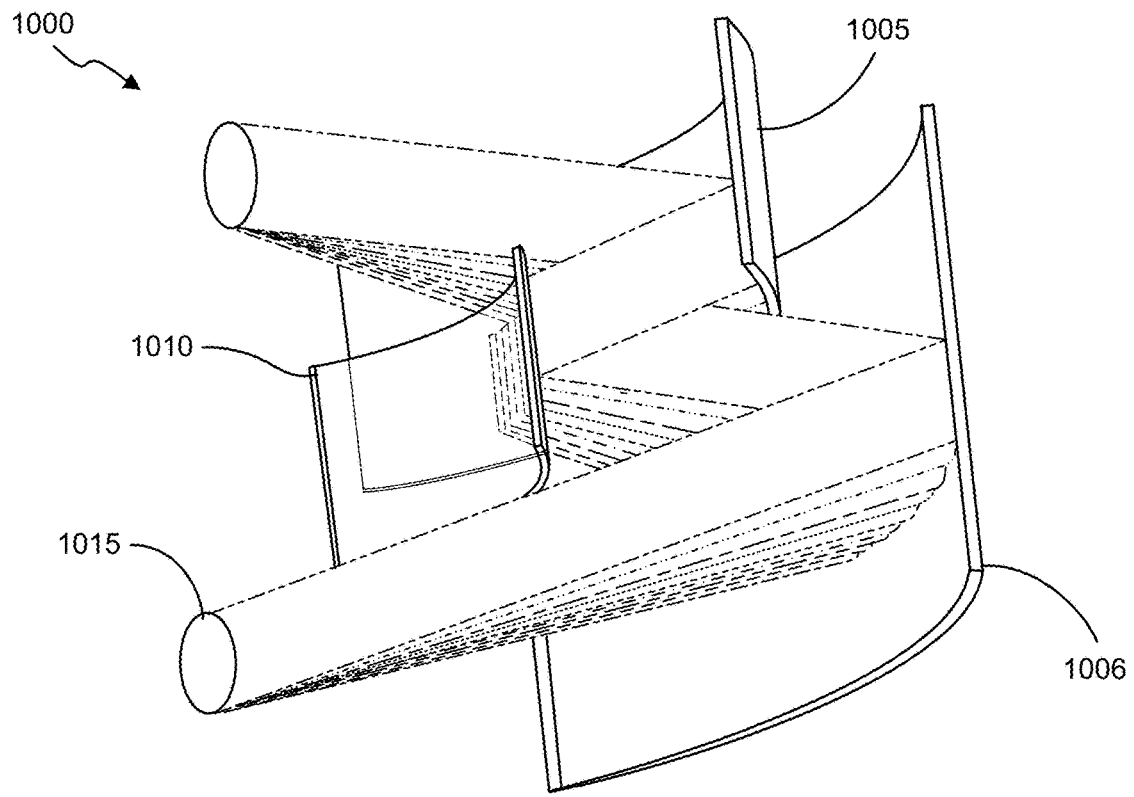
FIG. 10B provides a three dimensional rendering of the optical relay shown in FIG. 10A.

In the configurations shown in FIGS. 5-9B, the collimated light may exhibit little or no angular magnification (e.g., an angular magnification of about 1.0). In some cases, the first mirror may be completely split into two separate mirrors with non-symmetric positioning, which can allow for angular magnification, for example. FIG. 10A shows an optical relay 1000 where the first mirror is split into separate components. Collimated light 1015 interacts first with first mirror 1005, approaching at a tilted angle. First mirror 1005 directs light to second mirror 1010, which further directs light to third mirror 1006. FIG. 10B shows a three-dimensional rendering of optical relay 1010. By using different radii of curvature for first mirror 1005, second mirror 1010, and third mirror 1006, the angular magnification can be greater than or less than unity.

Figure 11A:
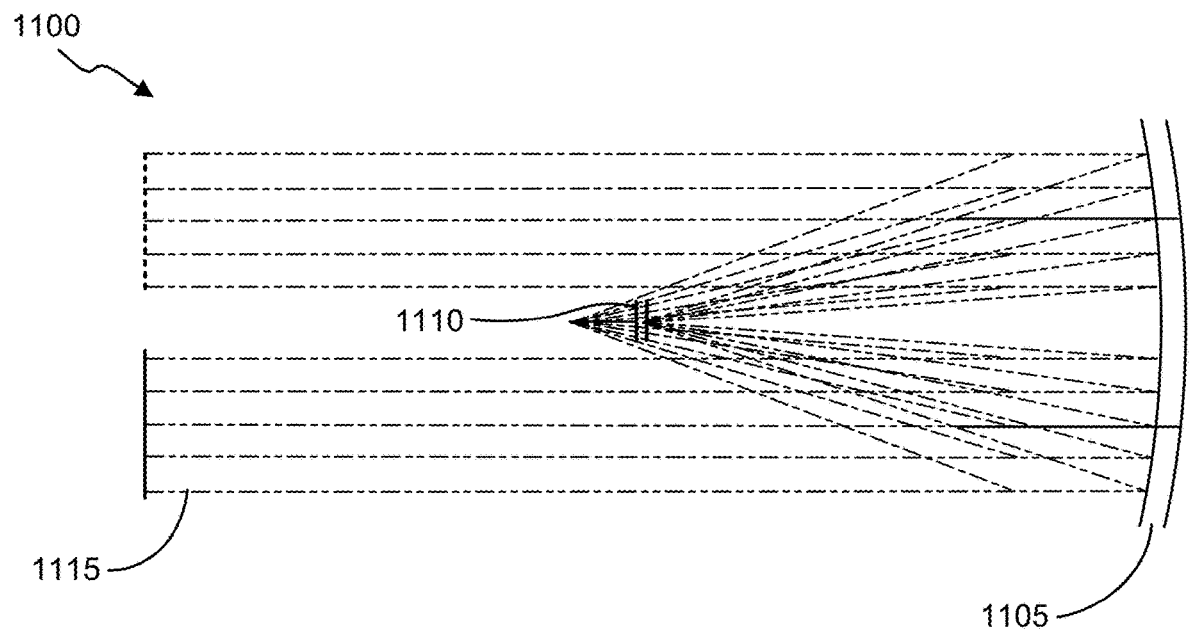
FIG. 11A and FIG. 11B provide schematic illustrations of a single-pass optical relay comprising toroidal mirrors with aspherical components.
Figure 11B:
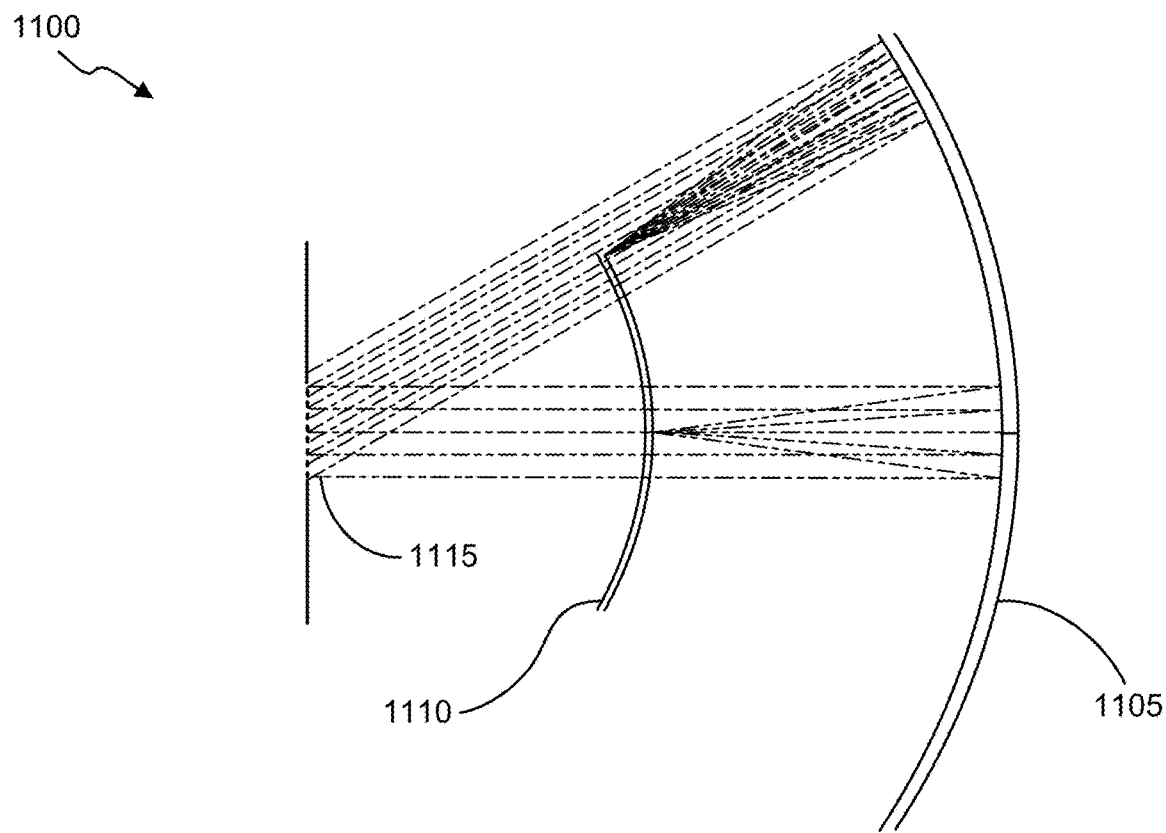

Although cylindrical mirrors can be used, as described above, mirrors with toroidal configurations can use, such as a toroidal mirror with aspherical components. Such mirrors may have one axis with cylindrical symmetry and one axis that is toroidal/aspherical in nature. Such mirrors may perform additional focusing along the toroidal axis, which may not be present in the case of cylindrical mirrors. FIG. 11A and FIG. 11B shows an example optical relay 1100 where FIG. 11A shows a view along a toroidal axis and FIG. 11B shows a view at about 90 degrees relative to that shown in FIG. 11A (along an axis of cylindrical symmetry), showing a single-pass configuration. First mirror 1105 focus light 1115 on second mirror 1110 in the configuration shown, which can allow second mirror 1110 to have not just a toroidal/cylindrical configuration as described, but such a mirror can even have reversed curvature.

Figure 12A:
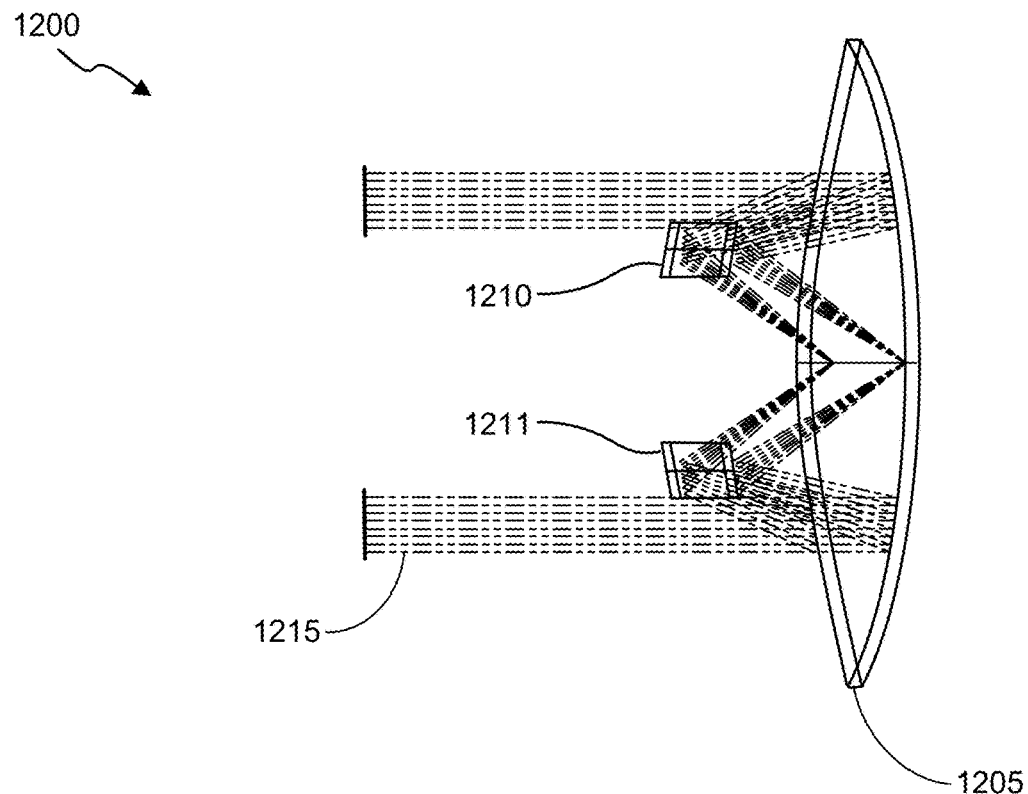
FIG. 12A and FIG. 12B provide schematic illustrations of a double-pass optical relay comprising toroidal mirrors with aspherical components.
Figure 12B:
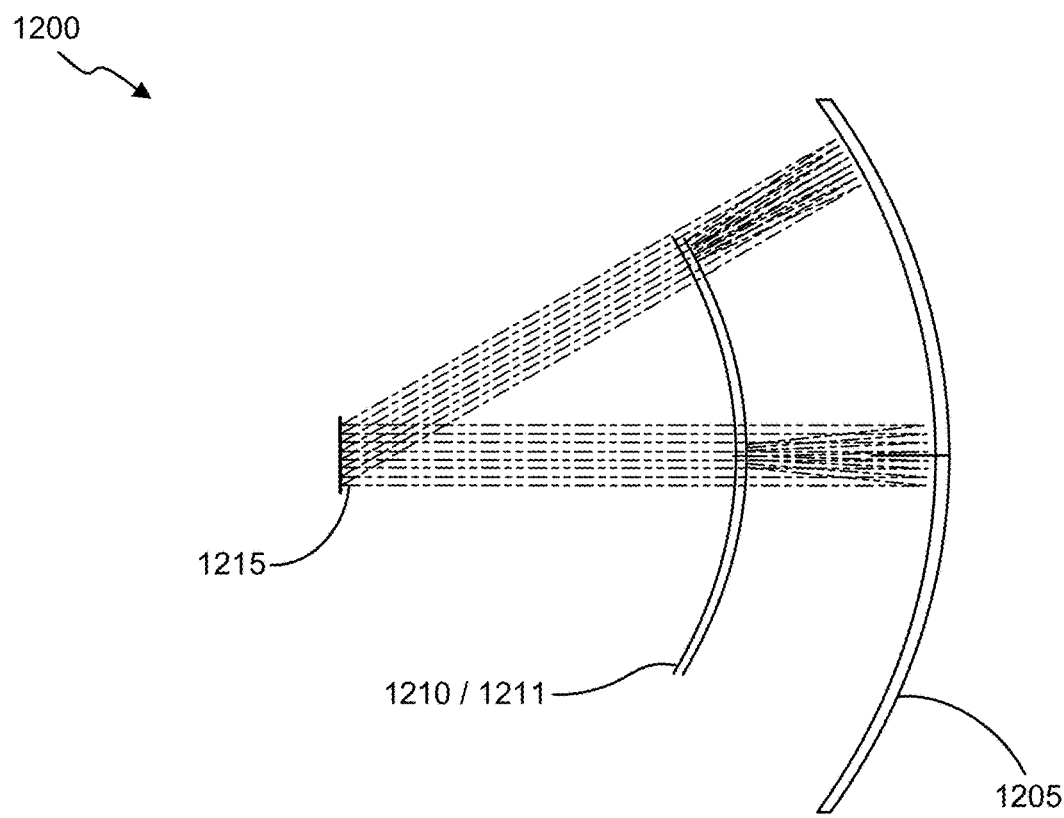

FIG. 12A and FIG. 12B shows an example optical relay 1200 with a double-pass configuration and employing toroidal mirrors with aspherical components, similar to optical relay 1100 shown in FIG. 11A and FIG. 11B. FIG. 12A shows a slight perspective view along the toroidal axis, with FIG. 12B showing a view at about 90 degrees relative to that shown in FIG. 12A, along an axis of cylindrical symmetry. Optical relay 1200 includes first mirror 1205 and second mirror 1210, which may be split into two separate components 1210 and 1211, if desired. Collimated light 1215 reflects from first mirror 1205 to second mirror component 1210, back to first mirror 1205, to second mirror component 1211, back to first mirror 1205, where it is reflected for output.

Figure 13:
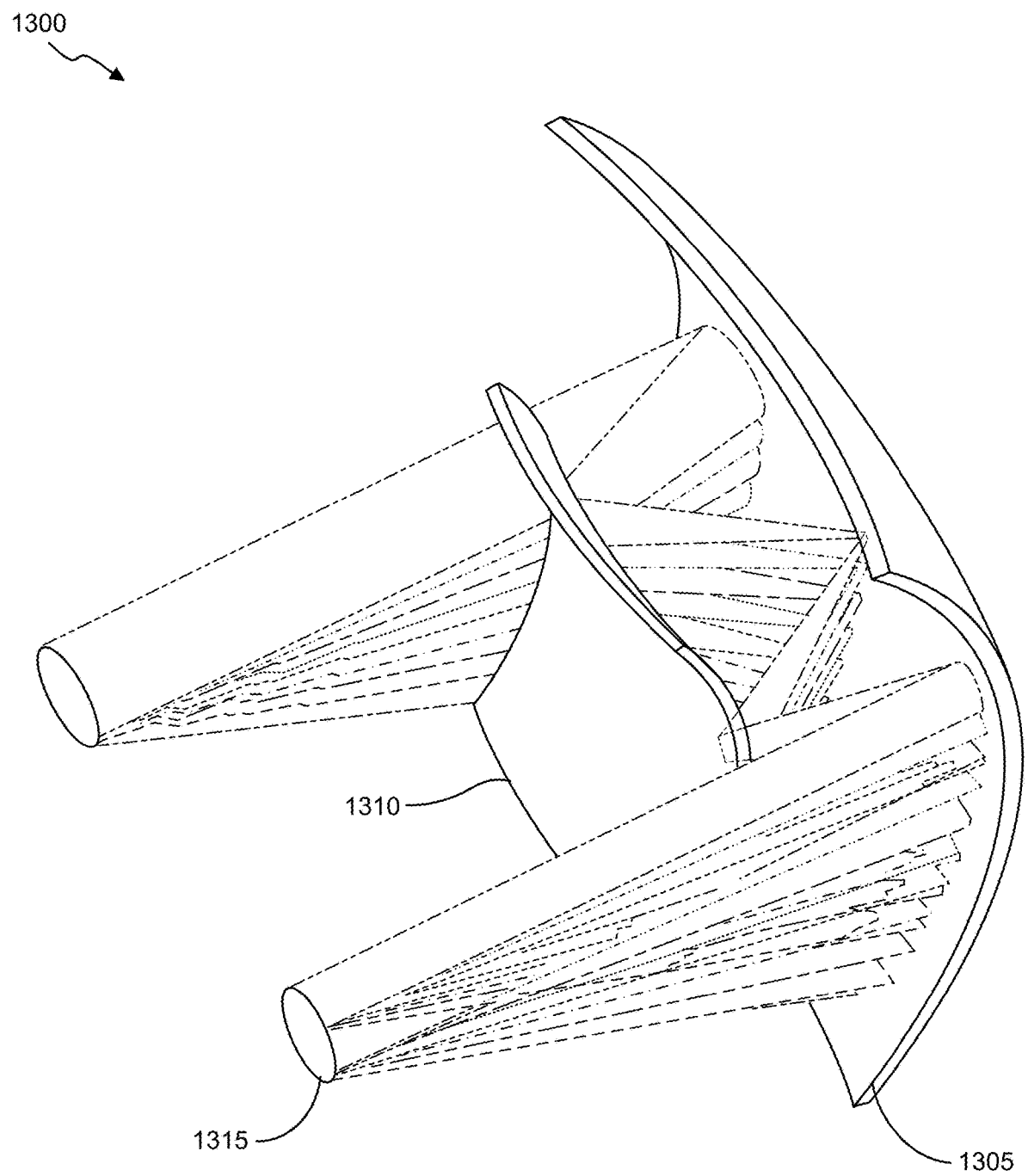
FIG. 13 provides a three-dimensional rendering of a double-pass optical relay comprising toroidal mirrors with aspherical components.

FIG. 13 depicts an example three-dimensional rendering of an optical relay 1300 similar to optical relay 1200, with a double-pass configuration and employing toroidal mirrors with aspherical components. Optical relay 1300 includes first mirror 1305 and second mirror 1310 and shows the path collimated light 1315 can take at various input angles. In the configuration shown in FIG. 13, second mirror 1310 has the toroidal axis arranged opposite to the toroidal axis of first mirror 1305, while the cylindrical axes of first mirror 1305 and second mirror 1310 are concentric.

Figure 14:
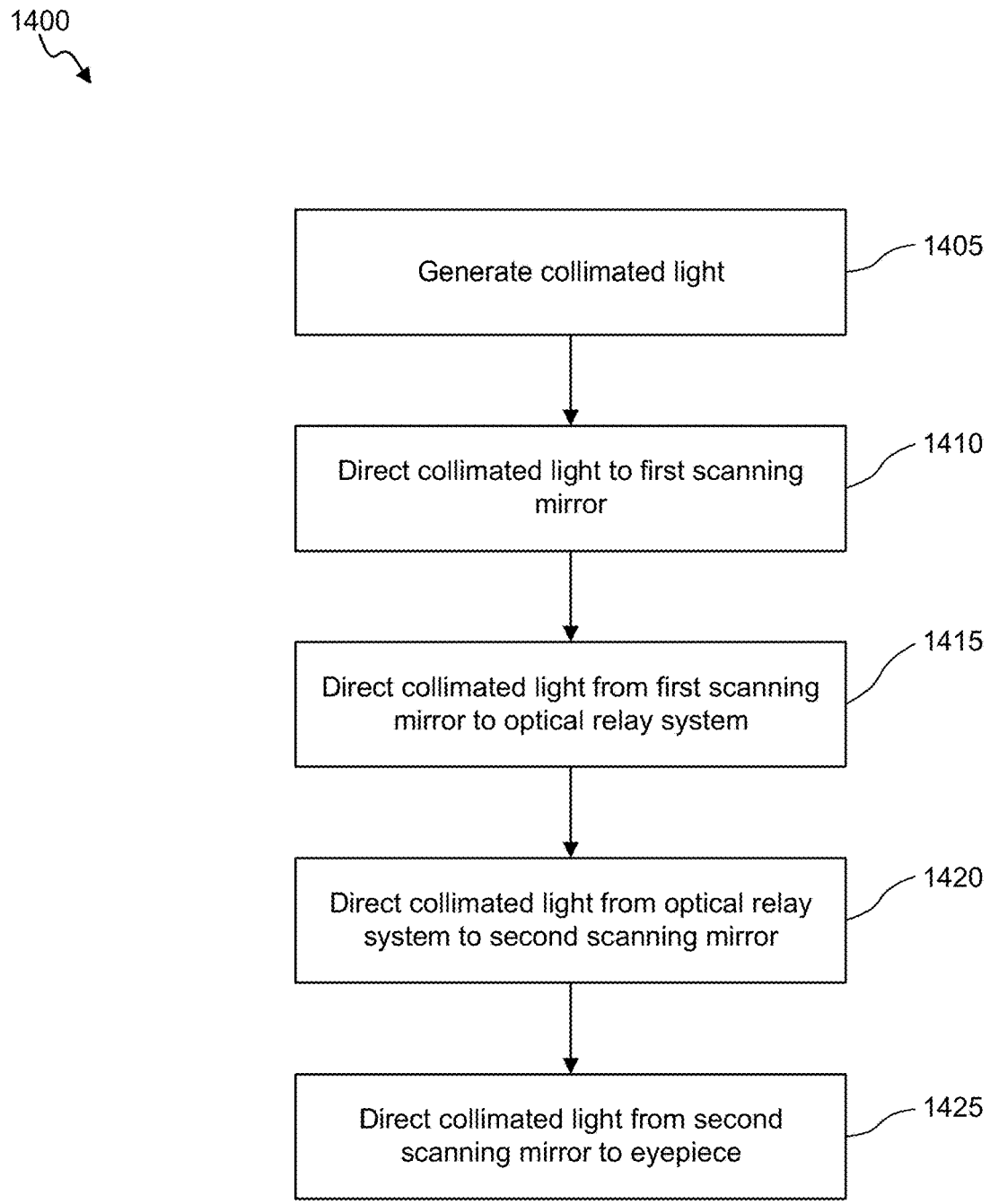
FIG. 14 provides an overview of an example image projection method in accordance with some embodiments.

FIG. 14 provides an overview of an example method 1400 for projecting an image. The image may comprise a raster scan image, as described above with respect to FIG. 1, for example. The image may comprise a frame in a video image in some cases, where multiple images may be displayed in sequence by repeating method 1400 one or more times in sequence. To generate an image, a light source may be modulated in time with the modulation of tilt angles in two scanning mirrors to display a sequence of pixels making up the raster scan image.

At block 1405, collimated light is generated. The collimated light may comprise light from a laser or light emitting diode, for example. In some cases, multiple light sources may be used to generate the collimated light, such as light sources emitting different colors. For example, in some embodiments, a green light source, a blue light source, and a red light source may be used and combined to allow for projection of any specific color by mixing an modulating the intensity of each color.

At block 1410, the collimated light is directed to a first scanning mirror. In some cases, the collimated light is emitted from the light source directly onto the first scanning mirror. However, in other cases, one or more intervening optical elements may be used, such as lenses, mirrors, waveguides, or the like. In some cases, multiple light sources may be mixed using a combining element. The first scanning mirror may have a first scan axis to allow tilting the first scanning mirror along a first range of angles to allow for reflecting collimated light along a first range of propagation directions about the first scan axis.

At block 1415, the collimated light from the first scanning mirror is directed from the first scanning mirror to an optical relay system. The optical relay system may be configured, sized, and/or arranged to receive collimated light from the first scanning mirror along the first range of propagation directions. The optical relay system may comprise multiple planar mirrors, concave mirrors, and/or convex mirrors arranged with respect to one another in a way to relay collimated light from the first scanning mirror to a second scanning mirror.

At block 1420, the collimated light from the optical relay system is directed to a second scanning mirror. Second scanning mirror may have a second scan axis, such as arranged perpendicular to the first scan axis. The second scanning mirror may be tilted along a second range of angles to allow for reflecting collimated light along a second range of propagation directions about the first scan axis. By using perpendicularly arranged scan axes, a raster image may be projected by scanning the first scanning mirror and the second scanning mirror appropriately.

At block 1425, the collimated light from the second scanning mirror is directed for projection, for example to an eyepiece of a head-mounted display device or a input aperture or structure to the eyepiece of the head-mounted display device.

Aspects of method 1400 may be controlled by a computing device, such as modulation of the collimated light and control over the scanning of the first scanning mirror and the second scanning mirror. In some cases, a computing device may perform processor executable instructions, as described in further detail below, to control aspects or components of an optical projection system for projecting images

COMPUTING DEVICE COMPONENTS

A computing device may be incorporated as part of the previously described systems, such as image projection systems, head-mounted display systems, and two-dimensional scanning systems. Computing devices may be useful for performing aspects of the previously described methods and systems. For example, computing devices may be useful for controlling modulation of a light beam. Computing devices may also be useful for controlling orientation and/or oscillation of a scanning mirror. Computing devices may also be useful for controlling application of a voltage or current. An example computing device comprises hardware elements that may be electrically coupled via a bus (or may otherwise be in communication). The hardware elements may include one or more processors, including without limitation one or ore general-purpose processors and/or one or more special-purpose processors (such as digital signal processing chips, graphics acceleration processors, video decoders, and/or the like); one or more input devices, which may include without limitation a mouse, a touchscreen, keyboard, remote control, voice input, and/or the like; and one or more output devices, which may include without limitation a display device, a printer, speaker, a servo, a linear actuator, a rotational actuator, etc.

The computing device may further include (and/or be in communication with) one or more non-transitory storage devices, which may comprise, without limitation, local and/or network accessible storage, and/or may include, without limitation, a disk drive, a drive array, an optical storage device, a solid-state storage device, such as a solid state drive ("SSD"), random access memory ("RAM"), and/or a read-only memory ("ROM"), which may be programmable, flash-updateable and/or the like. Such storage devices may be configured to implement any appropriate data stores, including without limitation, various file systems, database structures, and/or the like.

The computing device may also include a communications subsystem, which may include without limitation a modem, a network card (wireless or wired), an infrared communication device, a wireless communication device, and/or a chipset (such as a Bluetooth device, a Bluetooth Low Energy or BLE device, an 802.11 device, an 802.15.4 device, a WiFi device, a WiMax device, cellular communication device, etc.), a G.hn device, and/or the like. The communications subsystem may permit data to be exchanged with a network, other computer systems, and/or any other devices described herein. In many embodiments, the computing device will further comprise a working memory, which may include a RAM or ROM device, as described above.

The computing device also may comprise software elements, shown as being currently located within the working memory, including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the methods discussed above may be implemented as code and/or instructions executable by a computer (and/or a processor within a computer); in an aspect, then, such code and/or instructions may be used to configure and/or adapt a computer (or other device) to perform one or more operations in accordance with the described methods or for operation of the described devices and systems.

A set of these instructions and/or code may be stored on a non-transitory computer-readable storage medium, such as the non-transitory storage devices described above. In some cases, the storage medium may be incorporated within a computer system, such as the computing device described above. In other embodiments, the storage medium may be separate from a computer system (e.g., a removable medium, such as a compact disc, or a cloud- or network-based storage system), and/or provided in an installation package, such that the storage medium may be used to program, configure, and/or adapt a computer with the instructions/code stored thereon. These instructions may take the form of executable code, which is executable by the computing device or a component thereof and/or may take the form of source and/or installable code, which, upon compilation and/or installation on the computing device (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware may also be used, and/or particular elements may be implemented in hardware, software (including portable software, such as applets, etc.), or both. Further, connection to other computing devices such as network input/output devices may be employed.

As mentioned above, in one aspect, some embodiments may employ a computing device to perform methods in accordance with various embodiments. According to a set of embodiments, some or all of the procedures of such methods are performed by the computing device in response to a processor executing one or more sequences of one or more instructions (which may be incorporated into the operating system and/or other code, such as an application program) contained in the working memory. Such instructions may be read into the working memory from another computer-readable medium, such as one or more non-transitory storage devices. Merely by way of example, execution of the sequences of instructions contained in the working memory may cause the processor to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computing device, various computer-readable media may be involved in providing instructions/code to a processor for execution and/or may be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as a non-transitory storage device. Volatile media include, without limitation, dynamic memory, such as the working memory.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer may read instructions and/or code. Network-based and cloud-based storage systems may also be useful forms of computer-readable media.

Various forms of computer-readable media may be involved in carrying one or more sequences of one or more instructions to the processor for execution. Merely by way of example, the instructions may initially be carried on a magnetic disk and/or optical disc of a remote computer. A remote computer may load the instructions into its dynamic memory and send the instructions as signals over a transmission medium to be received and/or executed by the computing device.

The communications subsystem (and/or components thereof) generally will receive signals, and the bus then may carry the signals (and/or the data, instructions, etc. carried by the signals) to the working memory, from which the processor retrieves and executes the instructions. The instructions received by the working memory may optionally be stored on a non-transitory storage device either before or after execution by the processor.

It should further be understood that the components of computing device may be distributed. For example, some processing may be performed in one location using a first processor while other processing may be performed by another processor remote from the first processor. Optionally, systems described herein may include multiple independent processors that may exchange instructions or issue commands or provide data to one another. Other components of computing device may be similarly distributed. As such, a computing device may be interpreted as a distributed computing system that performs processing in multiple locations. In some instances, a computing device may be interpreted as a single computing device, such as a distinct laptop, desktop computer, or the like, depending on the context.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. An optical projection system comprising:
a source of collimated light;
a first microelectromechanical system mirror positioned to receive collimated light from the source, the first microelectromechanical system mirror having a first scan axis, and the first microelectromechanical system mirror configured to reflect collimated light from the source along a first range of propagation directions about the first scan axis;
an optical relay system positioned to receive collimated light from the first microelectromechanical system mirror along the first range of propagation directions about the first scan axis and direct reflected collimated light, wherein the optical relay system comprises a double-pass relay having a split cylindrical element comprising a first component, a second component, and a third component, wherein the third component has a different radius of curvature from the first component and the second component, wherein the optical relay system includes a first mirror and a second mirror that are concentric, wherein the first mirror includes a first reflective surface directing and focusing the collimated light from the first microelectromechanical system mirror at a second reflective surface of the second mirror, and wherein the second reflective surface directs the focused light onto the first reflective surface, which reflects and collimates the directed light; and
a second microelectromechanical system mirror positioned to receive collimated light from the optical relay system, the second microelectromechanical system mirror having a second scan axis oriented perpendicular to the first scan axis, and the second microelectromechanical system mirror configured to reflect collimated light from the optical relay systems at a second range of propagation directions about the second scan axis.

2. The optical projection system of claim 1, further comprising an eyepiece positioned to receive light reflected from the second microelectromechanical system mirror.

3. The optical projection system of claim 1, wherein the optical relay system comprises one or more planar mirrors, one or more convex mirrors, or one or more concave mirrors.

4. The optical projection system of claim 1, wherein the optical relay system comprises one or more cylindrical mirrors, one or more spherical mirrors, one or more toroidal mirrors, or one or more aspherical mirrors.

5. The optical projection system of claim 1, wherein the optical relay system comprises a double-pass relay having one or more cylindrical mirrors.

6. The optical projection system of claim 1, wherein the optical relay system comprises a double-pass relay having a cylindrical mirror and a toroidal mirror or an aspheric mirror.

7. The optical projection system of claim 1, wherein the optical relay system comprises a double-pass relay with a tilted configuration.

8. The optical projection system of claim 1, wherein the optical relay system comprises a double-pass relay exhibiting angular magnification.

9. The optical projection system of claim 1, wherein collimated light reflected from the first microelectromechanical system mirror undergoes at least three reflections in the optical relay system prior to reaching the second microelectromechanical system mirror.

10. The optical projection system of claim 1, wherein collimated light reflected from the first microelectromechanical system mirror undergoes at least five reflections in the optical relay system prior to reaching the second microelectromechanical system mirror.

11. A method for projecting an image, the method comprising:
generating collimated light from a source;
directing the collimated light to a first microelectromechanical system mirror, the first microelectromechanical system mirror having a first scan axis and configured to reflect collimated light from the source along a first range of propagation directions about the first scan axis;
directing collimated light from the first microelectromechanical system mirror to an optical relay system, the optical relay system configured to receive collimated light along the first range of propagation directions about the first scan axis and reflect collimated light, wherein:
the optical relay system comprises a double-pass relay having a split cylindrical element comprising a first component, a second component, and a third component, wherein the third component has a different radius of curvature from the first component and the second component;
the optical relay system includes a first mirror and a second mirror;
the first mirror includes a first reflective surface that directs and focuses the collimated light from the first microelectromechanical system mirror at a second reflective surface of the second mirror; and
the second reflective surface directs the focused light onto the first reflective surface, which reflects and collimates the directed light; and
directing collimated light from the optical relay system to a second microelectromechanical system mirror, the second microelectromechanical system mirror having a second scan axis oriented perpendicular to the first scan axis and configured to reflect collimated light along a second range of propagation directions about the second scan axis.

12. The method of claim 11, further comprising directing collimated light from the second microelectromechanical system mirror to an eyepiece.

13. The method of claim 11, wherein the optical relay system comprises one or more planar mirrors, one or more convex mirrors, or one or more concave mirrors, one or more cylindrical mirrors, one or more spherical mirrors, one or more toroidal mirrors, or one or more aspherical mirrors.

14. The method of claim 11, wherein the optical relay system comprises a double-pass relay having one or more cylindrical mirrors.

15. The method of claim 11, wherein the optical relay system comprises a double-pass relay having a cylindrical mirror and a toroidal mirror or an aspheric mirror.

16. The method of claim 11, wherein the optical relay system comprises a double-pass relay with a tilted configuration.

17. The method of claim 11, wherein the optical relay system comprises a double-pass relay exhibiting angular magnification.

18. A head-mounted display system comprising:
an optical projection system, wherein the optical projection system comprises:
a source of collimated light;
a first microelectromechanical system mirror positioned to receive collimated light from the source, the first microelectromechanical system mirror having a first scan axis, and the first microelectromechanical system mirror configured to reflect collimated light from the source along a first range of propagation directions about the first scan axis;
an optical relay system positioned to receive collimated light from the first microelectromechanical system mirror along the first range of propagation directions about the first scan axis and direct reflected collimated light, wherein the optical relay system comprises a double-pass relay having a split cylindrical element comprising a first component, a second component, and a third component, wherein the third component has a different radius of curvature from the first component and the second component, wherein the optical relay system includes a first mirror and a second mirror that are concentric, wherein the first mirror includes a first reflective surface directing and focusing the collimated light from the first microelectromechanical system mirror at a second reflective surface of the second mirror, wherein the second reflective surface directs the focused light onto the first reflective surface, which reflects and collimates the directed light; and
a second microelectromechanical system mirror positioned to receive collimated light from the optical relay system, the second microelectromechanical system mirror having a second scan axis oriented perpendicular to the first scan axis, and the second microelectromechanical system mirror configured to reflect collimated light from the optical relay systems at a second range of propagation directions about the second scan axis; and
an eyepiece comprising one or more optical components configured to receive and redirect light reflected by the second microelectromechanical system mirror to one or two eyes of a user.

* * * * *